Jan. 17, 1967     D. Z. HARTRANFT     3,298,225
PROVING RINGS
Original Filed Feb. 13, 1962
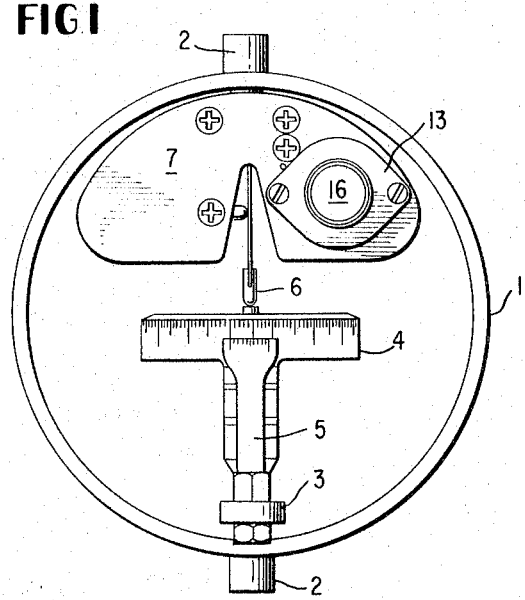
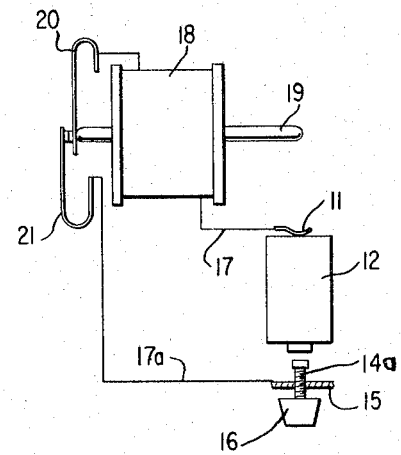
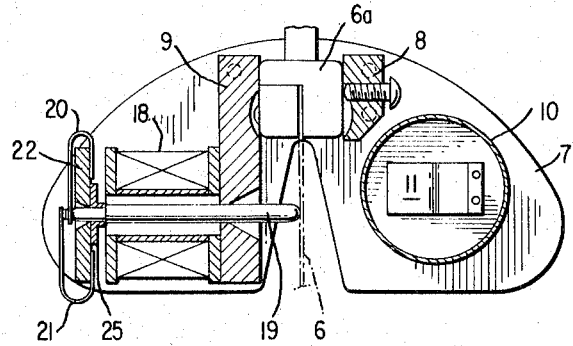
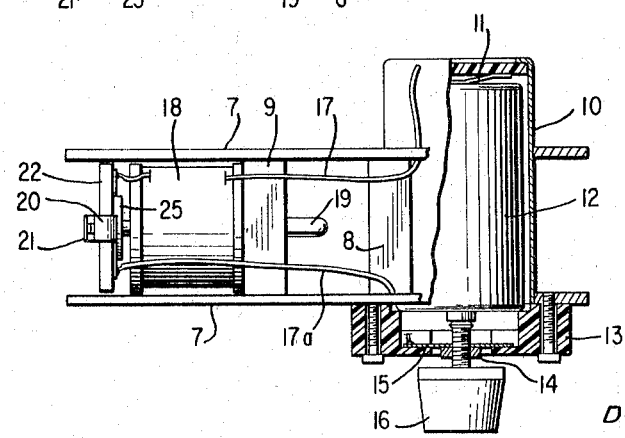
INVENTOR
DONALD Z. HARTRANFT
BY Pennie, Edmonds, Morton, Barrows & Taylor
ATTORNEYS 3,298,225
PROVING RINGS
Donald Z. Hartranft, York, Pa., assignor to Morehouse
Instrument Company
Continuation of application Ser. No. 172,938, Feb. 13,
1962. This application Mar. 9, 1966, Ser. No. 533,771
3 Claims. (Cl. 73—141)

This application is a continuation of my copending application, Serial No. 172,938, filed February 13, 1962, now abandoned.

This invention relates to proving rings of the type shown in U.S. Patent No. 1,648,375. The essential element of such proving rings is a ring of steel to which the force to be measured, either compression or tension, is applied to diametrically opposite points on its outer circumference to thereby distort the ring an amount directly indicating the force applied. In order to accurately determine the extent of the distortion resulting from the externally applied force the inside of the ring is equipped on one side extending radially inward from the point of applied load with an adjustable element, usually a threaded rod, and extending radially inward from the opposite point of the applied load is a vibrating reed, the freed end of which, when the reed is stationary, is in line with the end of the adjustable rod attached to the other side of the ring. In use the ring is placed between the two members to which the force to be determined is applied and after the load is applied to the ring the adjusting screw is turned until the end of the screw just contacts the free end of the vibrating ring. If the screw is turned slowly the rotation may be stopped at the exact instant that the screw contacts the free end of the ring, and the position of the screw can then be determined by a micrometer gauge which is moved by the rotation of the screw.

In the standard proving ring of the construction above described the vibration of the reed is started by hand, but if the adjustment of the screw is somewhat more prolonged than customary the vibration of the reed may be slowed down so that it will no longer register accurately the moment of contact. It has heretofore been proposed to provide means for mechanically vibrating the reed so that it will maintain a uniform vibration throughout the period of use. Such attachments as heretofore constructed have not proved satisfactory and the proving rings in use today still have a free reed which must be set in vibration by the operator.

The principal object of this invention is to provide a reed vibrating mechanism for the standard proving ring which will facilitate the use of the instrument and insure accurate readings even by untrained operators.

A further object of the invention is to provide a reed vibrating attachment which may be applied to standard rings now in use without any change whatsoever in the ring.

Other objects of the invention will appear from the following description taken in connection with the accompanying drawings wherein I have illustrated a preferred embodiment of my invention as now on the market.

In the said drawings,

FIG. 1 is a side elevation of the standard proving ring equipped with my improved reed vibrating mechanism;

FIG. 2 is a transverse vertical section of FIG. 1 through the attachment itself on an enlarged scale;

FIG. 3 is a horizontal cross-section on line 3—3 of FIG. 2; and

FIG. 4 is a wiring diagram showing the connection of the battery and the coil.

Referring to the drawings, particularly to FIG. 1, 1 indicates the ring itself with opposite bosses 2 to which the compression load is applied. 3 indicates the screw, the adjustment of which measures the forces applied to the bosses. As shown the screw is provided adjacent the end with a knob 4 provided with a scale as shown. Resting against the perimeter of the knob 4 is an indicator 5 marked with a micrometer scale whereby the exact adjustment of the screw may be easily read. The reed 6 is attached to the inner circumference of the ring in line with one of the bosses 2 as shown in FIG. 1. The reed 6 and the screw 3 are in axial alignment between the two bosses. The reed is mounted in a square projection 6a whose side faces are parallel and transverse to the main diameter of the ring.

The reed vibrating attachment consists of a frame made up of two plates 7 spaced apart by castings 8 and 9 to which the plates are attached by screws as shown in FIG. 1. The two plates 7 and the castings 8 and 9 define a square space which fits around the square base of the reed support 6a. The frame is attached to the base of the reed 6 by means of a set screw mounted in the casting 8 as shown in FIG. 2. Mounted in the plates 7 to one side of the reed is a battery chamber 10 of a size to hold a single standard flashlight battery 12. The chamber 10 has a bottom plate of plastic to which is attached a copper strip 11 forming a contact for one end of a conductor leading to the coil which actuates the reed vibrator.

The battery is held in place by a plastic cap 13 which is attached to the adjacent plate 7 by means of screws as shown in FIG. 3. The cap is provided with a shoulder which engages the rim of the battery 12 when the cell is in position and when the cap is in place the battery will be held tight between the plastic bottom and the shoulder of the cap 13.

The circuit from the battery to the coil comprises a conductor 17a which is soldered to a metal strip 15 attached to the inner face of the cap 13. Also soldered to the strip 15 is a threaded nut 14 in which there is mounted a screw contact 14a provided with an external knob 16. The screw 14a is formed with a head which overlies the central contact of the battery cell so that when the screw 16 is turned to advance the screw against the battery cell a firm contact will be established with the strip 15, to which the conductor 17a is attached.

The conductor 17 extends from the contact 11 at the bottom of the battery compartment to one end of the coil 18. The other end of the coil 18 is connected by a short conductor to the inner end of a U-shaped contact 20 which embraces one side of a fiber disk 22 supported between the plates 7 and the end of the coil remote from the vibrator. A similar U-shaped contact 21 is attached at one end to the other side of the fiber disk 22 and the end of the conductor 17a is soldered to the contact 21. The other end of the contact 21 is bent over the first named contact 20 so that the ends of the two contacts extending inwardly from the perimeter of the disk overlie each other and can be spaced apart a slight distance to provide a normally open switch in the circuit of the battery and coil.

Mounted for free axial movement in the casting 9 and the adjacent end of the coil is a plunger 19 of plastic material whose reduced end projects through a hole in the center of the disk 22 and contacts the inner surface of the U-shaped contact 20. The plunger 19 is preferably of molded plastic and is freely movable in its mounting in the disk 22 and casting 9. Between the adjacent end of the coil 18 and the fiber disk 22 is a disk 25 of magnetic metal which is attached to the plunger 19 and serves as the armature for the coil.

The free end of the plunger 19 projects through the casting 9 and lies immediately adjacent the reed 6 when the free ends of the contacts 20, 21 are in contact with each other. That is to say, the resistance of the reed to deflection is slightly greater than the resistance of the contact 20 to movement from its normally open position. When the circuit is closed by turning the screw 14a until it engages the contact of the battery, the coil will be energized, thereby attracting the armature 25 and moving the plunger 19 against the reed. The movement of the plunger 19 bends the reed and also allows the contact between the two contacts 20, 21 to open, de-energizing the coil so that the reed 6 can shift the plunger in the opposite direction to again bring the contacts 20, 21 in engagement.

The plunger 19 is very light in weight and a very slight movement is required to make and break the contact between the contacts 20, 21. The plunger 19 will therefore be rapidly reciprocated and impart to the reed 6 a rapid vibration of small amplitude which will be maintained as long as the screw 14 engages the battery contact. In using the ring the circuit through the coil will be closed and the reed set in motion with the screw 3 retracted so as to be well out of contact with the end of the reed. The screw will then be slowly turned until the end of the screw is touched by the end of the reed. As the vibration of the reed is regular and exact as to both time and amplitude the slightest contact of the screw and reed will be audibly discernible and the distortion of the ring will be accurately indicated.

I claim:

1. A proving ring adapted to be distorted by externally applied forces, means for indicating the extent of such distortion comprising a vibratable reed projecting radially inwardly from mounting means attached to an inner surface area of said ring, a contact member projecting radially inwardly from a diametrically opposite surface area on the inside of the ring, means for adjusting the length of said contact member, means for indicating the exact length of said contact member within its range of adjustment, and means for vibrating said reed comprising a coil supported by said ring with its axis at right angles to said reed, a plunger mounted for free movement axially of said coil, a spring for holding the end of said plunger in contact with said reed, a battery carried by said ring, conductors connecting the poles of said battery to the opposite terminals of said coil, interrupter contact elements separately mounted from said reed in circuit with said conductors, and an armature attached to said plunger and separately mounted from said contact elements, said elements being opened and closed by the movement of the plunger.

2. The proving ring of claim 1 wherein the reed vibrating mechanism is carried by a frame detachably connected to said reed mounting means.

3. The proving ring of claim 2 wherein the frame comprises two segmental plates, one on each side of the reed, with the coil supported between the plates.

References Cited by the Examiner
UNITED STATES PATENTS

| | | | |
|---|---|---|---|
| 1,081,635 | 12/1913 | Stritter | 340—388 |
| 1,694,187 | 12/1928 | Lewis | 73—141 |

RICHARD C. QUEISSER, *Primary Examiner.*

C. A. RUEHL, *Assistant Examiner.*